US010475346B1

(12) United States Patent
Sheth et al.

(10) Patent No.: US 10,475,346 B1
(45) Date of Patent: Nov. 12, 2019

(54) MILES-IN-TRAIL WITH PASSBACK RESTRICTIONS FOR USE IN AIR TRAFFIC MANAGEMENT

(71) Applicant: USA as Represented by the Administrator of the National Aeronautics & Space Administration (NASA), Washington, DC (US)

(72) Inventors: Kapil S. Sheth, Campbell, CA (US); Sebastian A. Gutierrez-Nolasco, San Jose, CA (US)

(73) Assignee: United States of America as Represented by the Administrator of NASA, Washington, DC (US)

( * ) Notice: Subject to any disclaimer, the term of this patent is extended or adjusted under 35 U.S.C. 154(b) by 0 days.

(21) Appl. No.: 14/878,956

(22) Filed: Oct. 8, 2015

Related U.S. Application Data

(60) Provisional application No. 62/061,485, filed on Oct. 8, 2014.

(51) Int. Cl.
*G08G 5/00* (2006.01)
*G08G 5/04* (2006.01)

(52) U.S. Cl.
CPC ............. *G08G 5/0017* (2013.01); *G08G 5/04* (2013.01)

(58) Field of Classification Search
CPC .......... G08G 5/00; G08G 5/04; G08G 5/0043; G08G 5/0021; G08G 5/0026;
(Continued)

(56) References Cited

U.S. PATENT DOCUMENTS 6,393,358 B1 * 5/2002 Erzberger ................. G01S 7/22 340/961
6,633,810 B1 * 10/2003 Qureshi ................. B64D 43/00 244/75.1

(Continued)

OTHER PUBLICATIONS

"Traffic Flow Management in the National Air Space", FAA Booklet, Oct. 2009, 35 pages.*

(Continued)

*Primary Examiner* — Alexander G Kalinowski
*Assistant Examiner* — Sanjeev Malhotra
(74) *Attorney, Agent, or Firm* — Rhys W. Cheung; Robert M. Padilla

(57) ABSTRACT

Method of miles-in-trail passback restrictions for use in air traffic management. Miles-in-trail restrictions can be used as a traffic management initiative when downstream traffic congestion at airports or in sectors is anticipated. To successfully implement the miles-in-trail at airspace fixes or navigational aids, it is desired that restriction values be computed for passing back to upstream facilities at specific boundaries. This method incorporates traffic manager feedback, resulting in significant improvement in guidance. Additional operational considerations required by traffic managers to implement the passback restrictions, namely maximum ground delay and absorbable airborne delay, are used in this method. The method also includes the step of absorbing a small amount of ground and airborne delays which are sufficient to handle the imposed constraint. The method further includes the step of implementing the passback restrictions to provide traffic managers ways to alleviate traffic constraints for reducing excessive airborne delay for current traffic conditions.

16 Claims, 6 Drawing Sheets

(58) Field of Classification Search

CPC .. G08G 5/0034; G08G 5/0039; G08G 5/0082; G08G 5/025; B64D 43/00; G01C 23/00; G01S 13/91; G01S 7/22; G05D 1/0676; G06K 1/00335; G06Q 10/0631; G06Q 50/30; G06T 7/20; G08B 13/19602; G08B 13/19682

USPC ........... 701/18, 120, 122; 340/961; 348/150; 244/75.1

See application file for complete search history.

(56) References Cited

U.S. PATENT DOCUMENTS 7,702,427 B1 4/2010 Sridhar et al.
8,290,696 B1 10/2012 Sridhar et al.
2008/0074496 A1* 3/2008 Venetianer ......... G06K 9/00335 348/150
2009/0105935 A1* 4/2009 Jha ....................... G08G 5/0034 701/120
2010/0217461 A1* 8/2010 Ledesma .............. G05D 1/0676 701/18
2014/0343833 A1* 11/2014 Baiada ............... G06Q 10/0631 701/122
2015/0269846 A1* 9/2015 De Prins .............. G08G 5/0043 701/120

OTHER PUBLICATIONS

Volpe National Transportation Systems Center, Enhanced Traffic Management System (ETMS) Functional Description, Version 5.0, U.S. Department of Transportation, Jun. 30, 1995, Cambridge, Massachusetts.

Bilimoria, et al., FACET: Future ATM Concepts Evaluation Tool, Proceeds of the 3rd USA/Europe Air Traffic Management R&D Seminar, Jun. 13-16, 2000, Napoli, Italy.

Bilimoria, et al., Facet: Future Concepts Evaluation Tool, Air Traffic Control Quarterly, 2001, 1-20, 9-1.

Sridhar, Future ATM Concepts Evaluation Tool (FACET) Background, Capabilities and Plans, Proceeds of TIM on Fast-time Simulation Models and Tools CENA, Nov. 4-6, 2003, Athis-Mons, France.

* cited by examiner

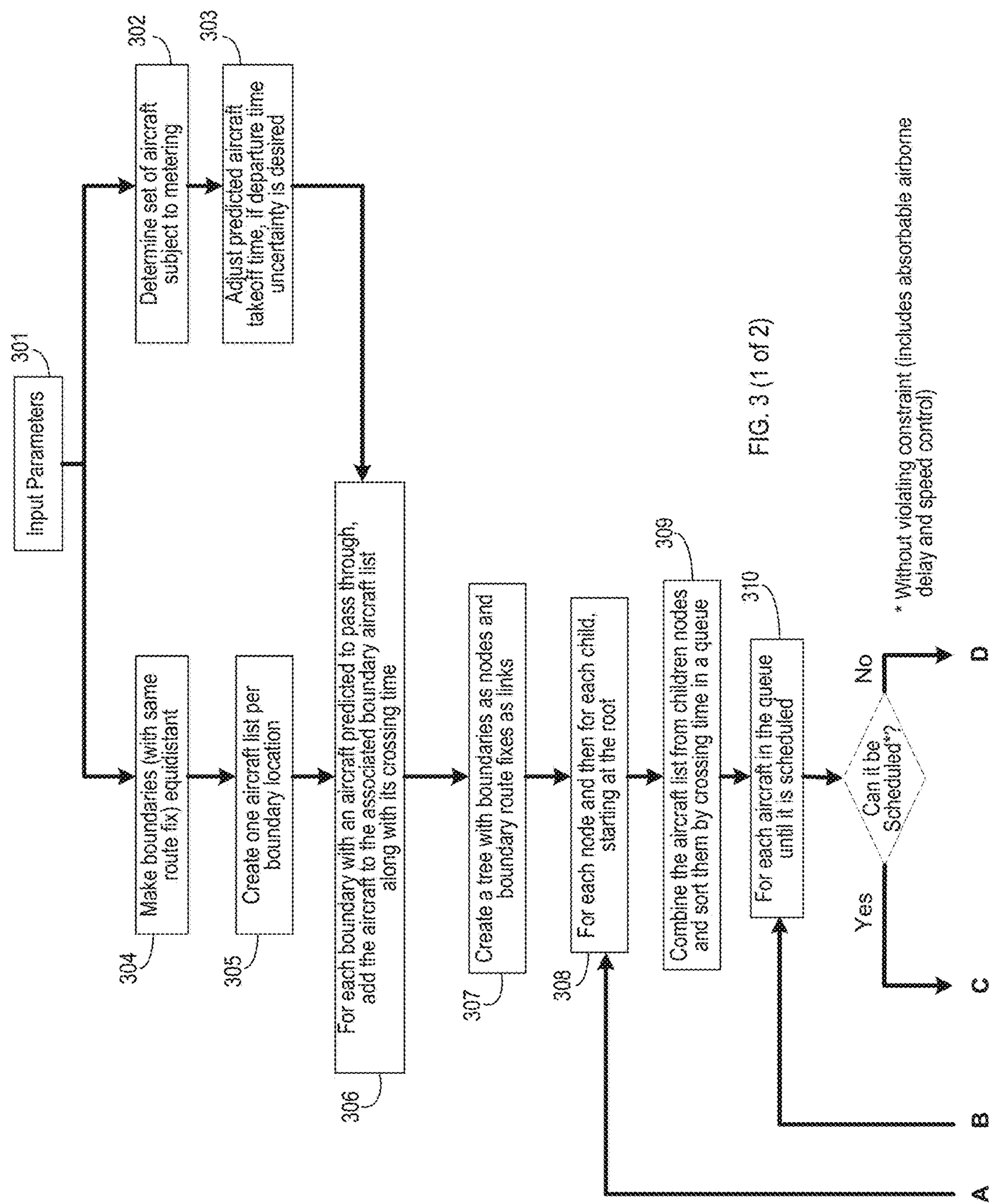
FIG. 3 (1 of 2)

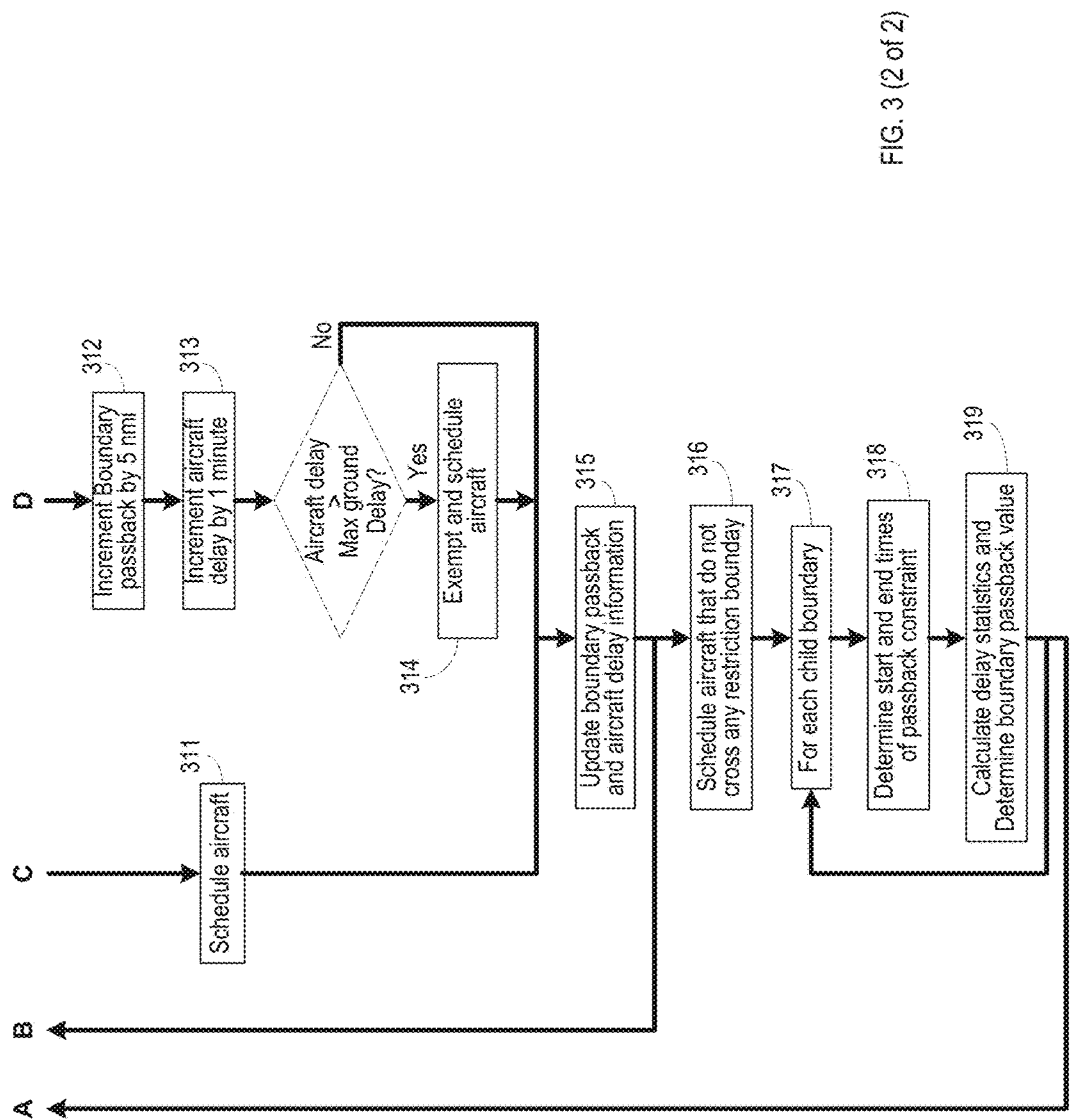
FIG. 3 (2 of 2)

MILES-IN-TRAIL WITH PASSBACK RESTRICTIONS FOR USE IN AIR TRAFFIC MANAGEMENT

CROSS REFERENCE TO RELATED APPLICATIONS

This application claims priority to U.S. Provisional Application No. 62/061,485, filed on Oct. 8, 2014, which is hereby incorporated by reference in its entirety.

ORIGIN OF INVENTION

The invention described herein was made in the performance of work under a NASA contract and by an employee of the United States Government and is subject to the provisions of Public Law 96-517 (35 U.S.C. § 202) and may be manufactured and used by or for the Government for governmental purposes without the payment of any royalties thereon or therefore.

TECHNICAL FIELD

The present invention relates to Miles-in-Trail restrictions for use in air traffic management.

BACKGROUND OF THE INVENTION

Air traffic managers in the National Airspace System (NAS) regularly implement various traffic management initiatives to handle traffic in a safe and efficient manner. One such initiative is the Miles-in-Trail (hereafter MIT) restriction, which is used when downstream traffic congestion at airports or in sectors is anticipated. Imposed MIT is the value of spacing required between aircraft flying along a certain path. They help the air traffic managers control the flow of aircraft downstream of an air traffic control facility. MITs may be implemented independently or in conjunction with other initiatives (e.g., a severe weather avoidance plan route or a playbook route, ground delay programs, etc.).

A typical scenario is shown in FIG. 1. Here, there are three Air Route Traffic Control Centers (ARTCC) identified as ZLC (Salt Lake City Center), ZMP (Minneapolis Center), and ZDV (Denver Center). The primary metering constraint of concern here is ABR (Aberdeen, S. Dak.). The dashed lines represent air traffic flow streams. The passback boundary locations are identified as B1-B4. The problem arises when, for example in ZMP, where there are two converging streams that join at ABR (Aberdeen, S. Dak.). When congestion is anticipated to occur downstream of ABR and a primary MIT constraint is imposed at a ABR, a MIT value must be "passed back" to HLN (Helena, Mont.) and RAP (Rapid City, S. Dak.) such that aircraft are delayed at B1 and B2 to ensure that the required MIT value is achieved at ABR. Since traffic from CZI (Crazy Woman, Wyo.) and EKR (Meeker, Colo.) travels to RAP, MIT constraints need to be passed back at B3 and B4 as well.

Traffic in both streams (from HLN and RAP) must be considered in determining the passback values so that the merged stream that exits B1 and B2 and meets at ABR satisfies the primary metering constraint at ABR. Thus, in order to ensure that traffic exiting ABR meets the primary metering constraint, passback values must propagate back to B1, B3 and B4 (for the southern stream) and through B2 (for the northern stream). Also consider that independent aircraft (shown in FIG. 1 as X1) that may not pass through a boundary at all may also join mid-stream further exacerbating the problem.

Previous methods for MIT calculation make gross assumptions about required spacing when congestion occurs and therefore are inherently suboptimal. If the MIT required value at ABR must be 15 nmi, the general assumption is that the input stream from B1 (through RAP) must be 30 nmi and the input stream from B2 (through HLN) must be 30 nmi such that when they merge, 15 nmi can be achieved at ABR. The previous solution did not consider the density of traffic on the RAP stream as compared to the HLN stream (or vice versa).

In light of the shortcomings of the previous solution, there exists a need for a system and method for managing air traffic that optimizes MIT throughout the system thus improving the efficiency of traffic flow (by minimizing delays) through the entire National Airspace system.

SUMMARY OF THE INVENTION

The method presented in this document determines passback restriction values for a metering constraint based on current and predicted air traffic information. The method can handle multiple merging streams of traffic and it allows for the specification of multiple boundary locations, aircraft speed control, ground delay and airborne holding at the boundary.

The uniqueness of the method is the merging of boundary streams passing through the same downstream metering constraint for flow rate calculations. The advantage of this approach is the ability to identify and properly compensate short-lived flow imbalances due to short-term bursts of traffic, without imposing unnecessary and inequitable delays or over-constraining the stream flow at boundary locations.

This is achieved by using an aircraft scheduler to find the best possible scheduling at the primary metering constraint first, and then using this information to determine flow rate calculations and boundary crossing times. Finally, the flow rate calculations and boundary crossing times are used to estimate the boundary spacing and activation times for each boundary. This process is then repeated for each upstream location until all aircraft are scheduled and all boundaries have their spacing and activation times set.

The main result of the system described herein is that absorbing small amounts of ground and airborne delays (by vectoring or in a holding pattern) substantially reduces the passback values required to enforce the primary metering constraint. The computed solutions are traffic and time sensitive, and therefore must be updated as needed, but this is an expected aspect of the problem.

The present invention additionally provides a method for managing air traffic for optimal throughput of air traffic, the method using miles-in-trail passback restrictions for aircraft traveling in multiple merging routes through intermediate boundaries across a common metered location that satisfies the primary miles-in-trail restriction at the common metered location, the method comprising the steps of initializing system default limits by accepting and validating input parameters; compiling a list of all aircraft predicted to pass through the common metered location having the primary miles-in-trail restriction within a specified time window; ordering the list of aircraft based on predicted time of arrival at the common metered location having the primary miles-in-trail restriction; creating equidistant intermediate boundaries on the merging routes that are equidistant from a downstream intermediate boundary or the common metered location having the primary miles-in-trail restriction; combining the equidistant intermediate boundaries that merge to the immediate downstream common metered location; and scheduling each aircraft to avoid violating the primary miles-in-trail restriction at the common metered location by increasing the passback value by a fixed amount and simultaneously incrementing the aircraft's delay by a fixed amount until all predicted times of arrival for all aircraft are optimized.

The present invention further provides a system for managing air traffic for optimal throughput of air traffic, the system using miles-in-trail passback restrictions for aircraft traveling in multiple merging routes through intermediate boundaries across a common metered location that satisfies the primary miles-in-trail restriction at the common metered location, the system comprised of an initializer for accepting and validating input parameters for setting system default limits; a memory, coupled to the initializer, for storing the valid input parameters and predicted times of arrival for each aircraft at the common metered location having the primary miles-in-trail restriction; a passback boundary estimator, coupled to the memory, having a processor configured to compute boundary miles-in-trail passback restrictions based on currently scheduled air traffic at the common metered location to satisfy the primary miles-in-trail restriction; and an aircraft scheduler, coupled to the passback boundary estimator, for updating the boundary miles-in-trail passback restrictions at intermediate boundaries for optimal throughput of air traffic.

Accordingly, for a better understanding of the invention, its functional advantages and the specific objects attained by its uses, reference should be made to the accompanying drawings, claims and descriptive matter in which there are illustrated preferred embodiments of the invention.

BRIEF DESCRIPTION OF THE DRAWINGS

FIG. 3 is a flow diagram of the general procedure.

DETAILED DESCRIPTION OF THE INVENTION

There are two critical shortcomings to the currently used approach of managing traffic by traffic managers. First, the previous system handled multiple streams of air traffic independently. This is problematic because in order to optimize the MIT calculation, each stream must consider others to which it may join. Second, the passback boundary locations (B1-B4) are at the boundaries of the ARTCCs. Consequently, they are not equidistant from their respective boundary locations on the other streams to which their stream will join.

Figure 1:
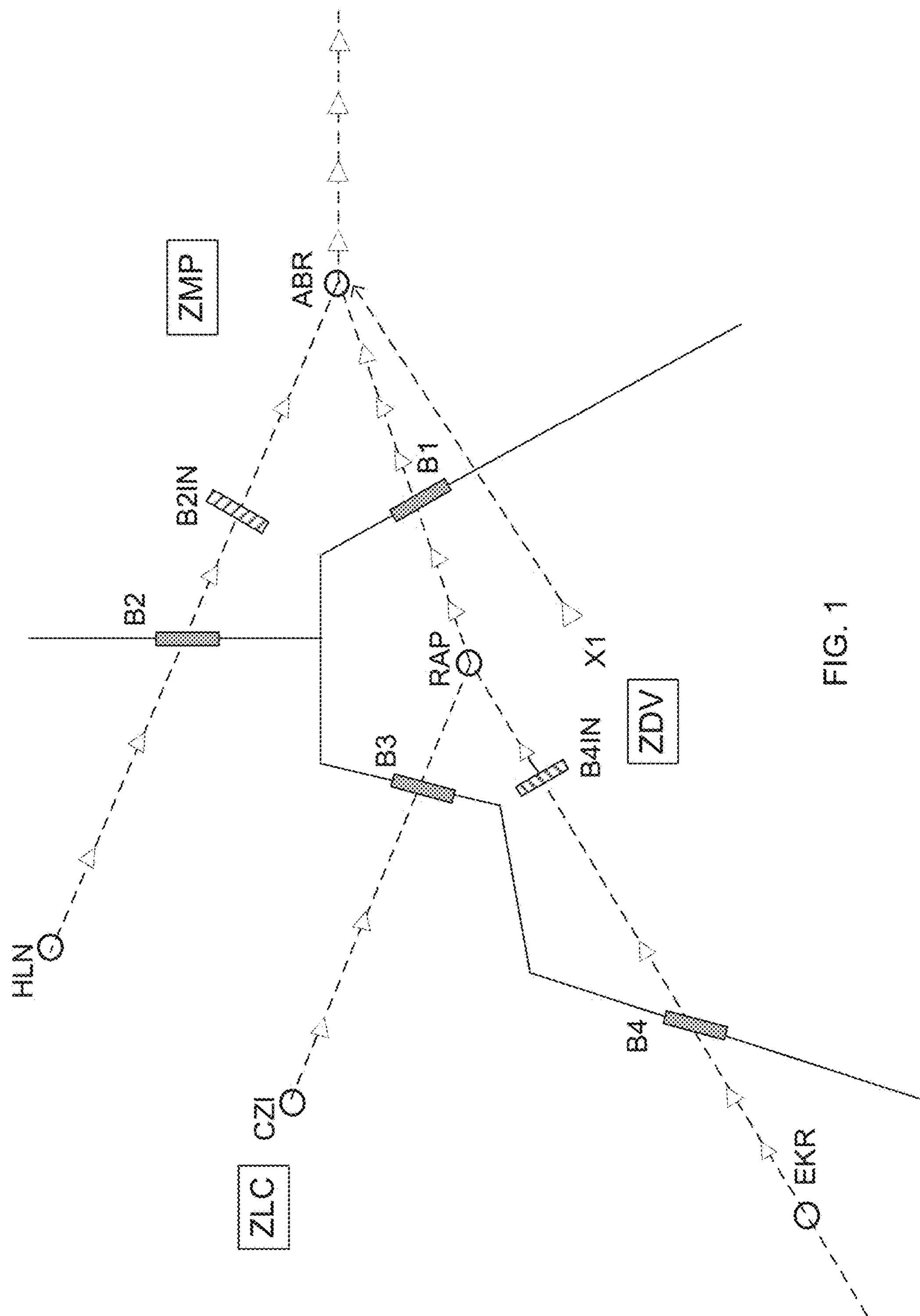
FIG. 1 is a schematic drawing of a typical scenario wherein the disclosed system optimizes the MIT values throughout each Center.
Figure 2:
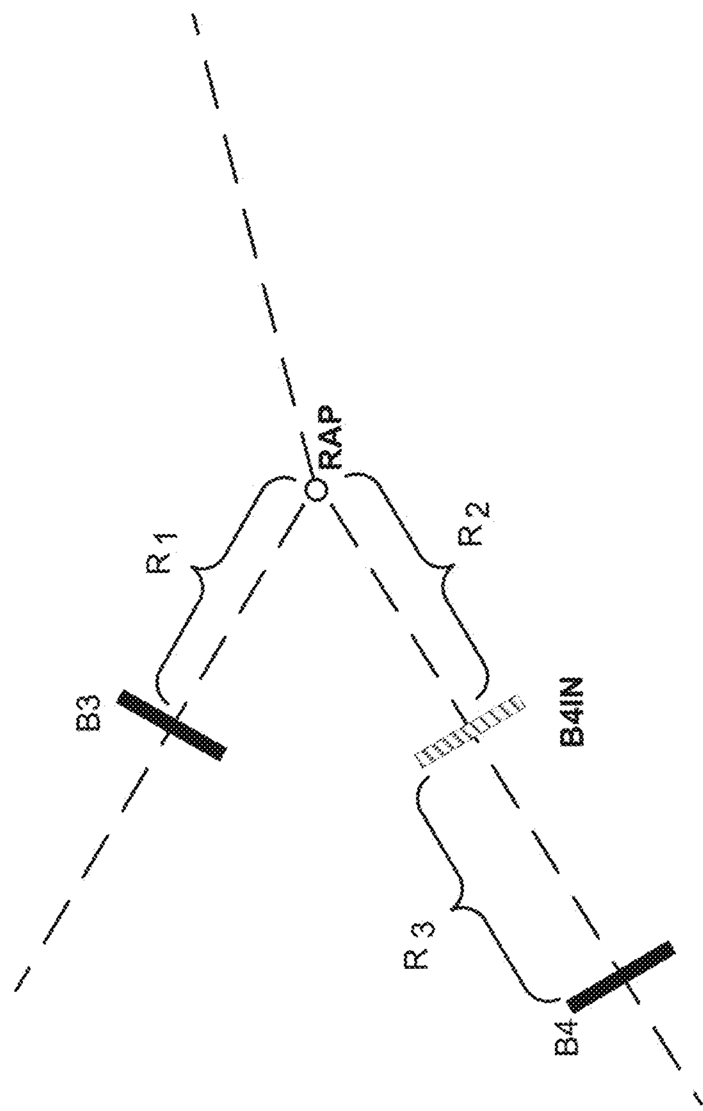
FIG. 2 is an expanded view showing how equidistant intermediate boundaries are created.

FIG. 2 is a magnified view of the RAP area of FIG. 1. In FIG. 2, B4 is further from RAP than is B3. The invention described here uses the boundary that is the shortest distance from the immediate downstream common metered location as the reference distance and then adds a virtual boundary to streams further from the immediate downstream common metered location at the reference distance. In FIG. 2, since the distance from B3 to RAP (shown as $R_1$) is less than the distance from B4 to RAP (shown as R2+R3), $R_1$ will be used as the reference distance. Virtual boundary B4IN is created at distance R2 from RAP (where $R_2=R_1$). B3 and B4IN are equidistant from RAP. Now, passback calculations can be made to B3 and B4IN such that traffic through RAP meets the miles-in-trail restriction. After the passback value is calculated for B4IN, an offset is added to aircraft passing through B4IN to account for the added distance to B4 (shown as $R_3$). These boundaries that are equidistant from the merge point will facilitate optimal MIT calculations as described below.

The following detailed description is of the best currently contemplated modes of carrying out various embodiments of the invention. The description is not to be taken in a limiting sense, but is made for at least the purpose of illustrating the general principles of the invention, since the scope of the invention is best defined by the appended claims.

General Procedure

The general procedure for the invention is shown in flowchart form in FIG. 3. The process begins by setting input parameters (301). These parameters might include the maximum allowable ground delay, the maximum air speed slowdown (to increase MIT for that aircraft), and the boundary holding limit (specified in time).

In parallel, the system sets up the boundaries for computation and creates the aircraft list. The aircraft list is the set of all aircraft subject to metering (302). This can be adjusted for uncertainty of departure time (optional) (303). The result here is a list of aircraft identifiers. The boundaries are adjusted so that within a route fix, they are equidistant from the desired merge point (304). A route fix is a line indicating each position in the sky reached by an aircraft following a specific route. One empty aircraft list is created for every boundary location to hold the aircraft identifiers for aircraft that will cross that boundary (305).

The two previous parallel procedures are brought together by determining, for each boundary which aircraft from the aircraft list will cross that boundary (306). The boundary lists are now populated. The system creates a tree data structure with boundaries as nodes and boundary route fixes as branches connecting the nodes (307).

For each boundary (node), schedule all aircraft that are expected to cross that boundary (308). For each boundary, make a list of all aircraft expected to cross that boundary by combining all flight routes that lead to that boundary. Sort all aircraft in those lists according to expected crossing time of the boundary and place in a queue data structure (309). Schedule each aircraft in the queue (310).

For each aircraft in the queue, if it can be scheduled without violating any constraints, then schedule that aircraft (311). If it cannot be scheduled, then increment the boundary passback value by 5 nmi (312). The 5 nmi value can be set as a parameter. Then increment the aircraft delay by one minute (313). The one minute delay time can also be set as a parameter. If the new settings for this aircraft exceed allowable maximum ground delay values (given as inputs in 301), then exempt this aircraft and schedule it (314). If the new delay values do not exceed delay limits, then update aircraft delay information (but do not schedule the aircraft), update boundary passback values (315) and return to step 310. Continue until all aircraft in this list are scheduled.

Schedule all aircraft that do not pass through any restriction boundary (thus they are not on any boundary aircraft list) (316).

Now that all the aircraft are scheduled for this boundary, for each child boundary (317) (meaning each boundary that feeds into the boundary currently being computed), determine the start and end times of the passback constraint (318). Lastly, calculate delay statistics and determine the passback value that will propagate through the tree (319). Return to step 308 and compute for the next boundary route fix (node) until all have been completed.

System Component Descriptions

Figure 4:
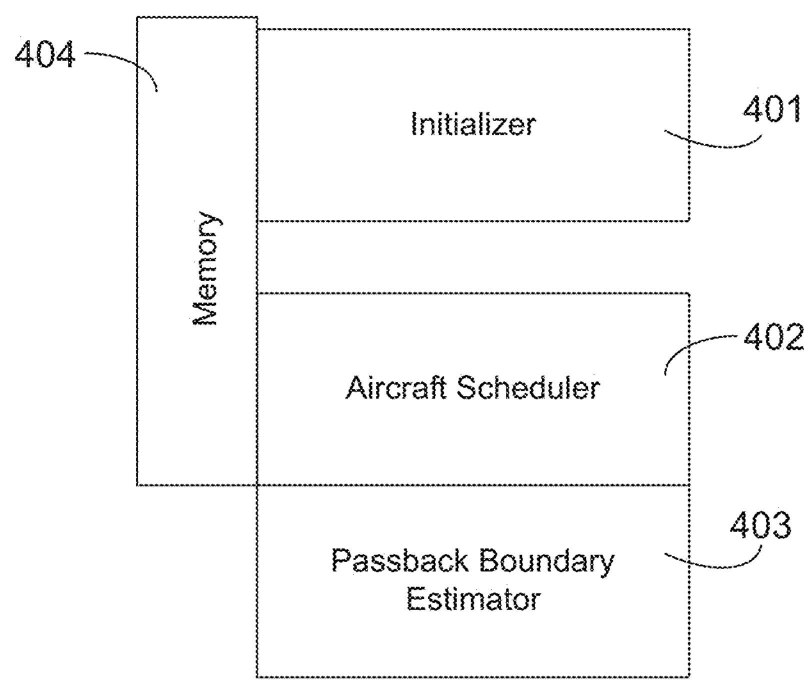
FIG. 4 is a schematic showing the main components of the system.

There are three primary components to the system (FIG. 4). The initializer (401) sets up the system with appropriate parameters for the computation. The aircraft scheduler (402) uses the input parameters to schedule each aircraft using the general procedure described above. Lastly, the passback boundary estimator (403) uses the data from the aircraft scheduler to calculate the passback values that will optimize throughput of the system while minimizing delays.

The Initializer Component (a) Expected Input and Output Information

The following is the expected set of input parameters for the initialization procedure:

1. A collection of primary metering constraints, where each metering constraint contains at least the following information:
   - Metering fix name or metering fix location as a (latitude, longitude) point.
   - Direction of the metering flow, which is specified via a route fix name.
   - Desired miles-in-trail at the metered fix (positive number).
   - Activation time (start and stop times).
2. A collection of boundaries (for passback locations), each one of them containing at least the following information:
   - Boundary name.
   - Boundary definition as a list of two (latitude, longitude) points.
   - Associated metering fix name or downstream boundary name, defining the dependence and direction of the flow for the boundary (aircraft passing through the boundary in the opposite direction will not be metered).
   - Optional activation time (start and stop times, initialized same as primary constraint).
   - Boundary miles-in-trail (non-negative number, default is zero).
   - Absorbable airborne delay, in minutes (non-negative number, default is zero).
   - Ensure equidistant boundary path length (boolean, default is false).
3. A list of airborne aircraft at the analysis start time, with at least the following information:
   - Aircraft type.
   - Aircraft position (latitude, longitude).
   - Aircraft current altitude.
   - Aircraft cruise altitude.
   - Aircraft speed.
   - Aircraft heading.
   - Aircraft flight plan information (origin, destination and route).
4. A list of aircraft predicted to depart within the analysis time frame, with the same information described above in addition to their predicted takeoff time.
5. Maximum aircraft slow down speed, as a percent of current cruise speed (default is zero).
6. Minimum required ground delay for predicted aircraft, in minutes (default is zero).
7. Maximum ground delay for predicted aircraft, in minutes (default is zero).
8. Include departure delay uncertainty for predicted aircraft (boolean, default is false).
9. Analysis time (start and stop times).

The Inputs are Consolidated in Three Groups:

A set of metering constraints and boundaries (1-2).

The aircraft list containing the airborne and predicted (3-4).

The parameters for the analysis (5-9).

Expected output information for each boundary definition provided includes:

Suggested miles-in-trail.

Suggested start-time.

Suggested end-time.

Number of aircraft scheduled to cross the boundary.

Estimated total, average, maximum and minimum aircraft passback delays.

In addition, individual aircraft information may be displayed.

(b) Definitions

The procedures do not impose restrictions on the boundary definition, but the following arguments affect the final output, and they deserve a careful explanation:

Boundary miles-in-trail: If the miles-in-trail of a boundary is a non-zero value, this value will be set for that boundary and will be unchangeable for the rest of the analysis. That is, the procedure will enforce the constraint and it will not attempt to predict it.

Absorbable airborne delay: If the boundary absorbable airborne delay is a non-zero value, an aircraft crossing the boundary can be held at the boundary for at most that value. Similarly, a zero value specifies no holding at the boundary.

Ensure equidistance boundary path length: In the case of boundaries with the same route fix, boundaries with shorter path lengths may prevent scheduling of aircraft crossing boundaries with longer path lengths. This behavior is acceptable, given that aircraft scheduling is done in a first-come, first-serve basis. Therefore, if the equidistant boundary path length is set to true, additional (in between) boundaries may be added to enforce equal distance path between specified boundary locations.

Maximum aircraft slow down: The amount of speed reduction per aircraft, as a percent of the aircraft speed for all aircraft. A zero value means no reduction.

Minimum required ground delay: Additional delay imposed to aircraft on the ground (pre-departure). If the value is greater than 500, pre-departure aircraft are not taken into account by the procedure. This enables the analysis of airborne aircraft only.

Maximum ground delay: When the total delay of a pre-departure aircraft reaches the maximum ground delay, the aircraft will be allowed to depart immediately. The maximum ground delay valid range is between the minimum required ground delay and the minimum required ground delay threshold value (500).

Departure delay uncertainty: If set to true, delay may be added to the predicted aircraft departure time based on the airport delay probability distribution and on-time performance data for the last five years.

(c) Initialization Procedure

1. Validate input arguments:
   a. Start or bring forward simulation-time to analysis start-time.
   b. Set simulation-end-time as the analysis start-time plus the analysis time frame.
   c. Verify minimum required ground delay and maximum ground delay are non-negative.
2. If the minimum required ground delay is less than skip-threshold.
   a. Add the minimum ground delay to the takeoff time of all predicted aircraft.
   b. If minimum required ground delay is greater than zero, adjust maximum ground delay by subtracting the minimum required ground delay to it and set the maximum ground delay of all predicted aircraft.
   c. If the departure delay uncertainty is set to true, for each predicted aircraft:
      i. Get the departure delay distribution and on-time percentage value for the departure airport.
      ii. Get a random sample from a uniform distribution between 0 and 1.
      iii. If the random value is greater than the on-time percentage value, get a random sample from the delay distribution and add it to the takeoff time.
3. Else
   a. Discard all elements in the predicted aircraft list (since skip threshold was selected as the minimum required ground delay, only airborne flights are considered).
4. Merge the lists of airborne and predicted aircraft into a sorted list by time called ac-list. Naturally, the predicted aircraft list was sorted by earliest takeoff time, and then added at the end of the airborne aircraft list.
5. Make a copy of the metering constraint and boundary data structures.
6. Update metering constraint using the input arguments (miles-in-trail, start-time, stop-time).
7. Create a noBoundary emulator.
8. Create the emulator-list as follows:
   a. Create an emulator for each boundary and add it to the emulator-list.
9. Sort emulator-list by decreasing miles-in-trail, so the combined emulator that contains the aircraft that crossed boundaries with unprescribed passback values is first.
10. For each emulator associated with a prescribed boundary:
   a. Update the passback restriction distance to the prescribed miles-in-trail value.
   b. Update the passback restriction start-time and stop-time to the prescribed start and stop values.
11. For each aircraft in the ac-list that is predicted to pass through the metering constraint in the proper direction:
   a. For each boundary the aircraft is predicted to cross within the analysis time frame:
      i. Add a copy of the aircraft to the passback-aircraft-list of the emulator corresponding to that boundary.
   b. If the aircraft is predicted to not cross any boundary:
      i. Add a copy of the aircraft to the passback-aircraft-list of the noBoundary emulator.
12. Clear the ac-list.
13. For each emulator in the emulator-list:
   a. If the passback-aircraft-list is empty:
      i. Remove the emulator.
   b. Else
      i. Sort the passback-aircraft-list based on the time the aircraft is predicted to cross the boundary (time ordered).
14. If the noBoundary emulator passback-aircraft-list is empty:
   a. Remove the noBoundary emulator
15. Else
   a. Sort the passback-aircraft-list based on the time the aircraft is predicted to cross the center boundary where the parent metering constraint is located.

The Aircraft Scheduler Component

The aircraft scheduling process is accomplished by a set of center emulators. The concept of the center emulator was devised as a way to encapsulate passback information for a given boundary location of the center. This simplifies the logic of the scheduling procedure. In addition, the emulator concept allows the grouping and uniform handling of aircraft that do not cross a boundary location, but still must be metered because they pass through the primary metering constraint in the proper direction. Basically, the emulator keeps track of aircraft crossing the boundary location, their unrestricted and scheduled crossing times, as well as the current passback restriction information (minimum and average distance for example). There is an emulator for each boundary location and a special noBoundary emulator to encapsulate aircraft that do not cross a boundary, but pass through the active metering constraint in the proper direction. NoBoundary aircraft are sorted by the time they reach the center that contains the parent metering constraint. The initialization step ensures a proper setup, which is important given the multiple calls from the boundary passback procedure.

The scheduling procedure tries to schedule aircraft as soon as they cross the center boundary or they takeoff within the center. Aircraft that pass through a boundary cannot be held within the center where the boundary is located, so if the spacing at the boundary is not sufficient to schedule the aircraft without holding, the holding delay required to schedule the aircraft is generated and the boundary holding limit is subtracted from it. If the resulting delay is zero or less, the aircraft is scheduled. Otherwise, the resulting delay is assigned as a passback delay for that aircraft and the required distance at the boundary is increased by the passback-increment value. The passback delay is the amount of time the aircraft needs to absorb before reaching the boundary. Aircraft that do not cross a boundary can be held within the center if necessary. In particular, the scheduling follows a first-come, first-served mechanism in a round-robin fashion among emulators. Thus, at most one aircraft per emulator is scheduled at any given time. At the end of each round, if all boundary aircraft were successfully scheduled, then all flying noBoundary aircraft are scheduled before proceeding to the next round. The difference between the start time and the schedule time of a noBoundary aircraft is considered the holding time for that aircraft.

The output of the aircraft scheduler is a time-ordered passback aircraft list sorted by scheduled time for each boundary. A passback aircraft contains a copy of the original aircraft information, start, scheduled and metered times, distance to the aircraft in front of it when scheduled, and the passback delay required for the scheduling.

(a) Assumptions for Aircraft Scheduler

There are a set of assumptions corresponding to this process including:

Fairness is not assumed or enforced.

Initial simulation-time is less than or equal to the metering constraint start-time.

Passback-aircraft-lists are time-ordered, so first-come first-served can be enforced.

Unscheduled is a reference to an aircraft.

Time-step is one minute.

Passback-increment is 5 nmi.

Skip-threshold is a constant with value 500, which determines if pre-departure aircraft must be considered in the analysis.

(b) Aircraft Scheduling Procedure

1. Call the Initialization procedure.
2. Set passback restriction list empty.
3. While simulation-time is less than simulation-end-time:

a. Set unscheduled to null.

b. For each emulator:

i. Get an aircraft from the passback-aircraft-list.

ii. If the aircraft predicted crossing time is less than or equal to simulation-time and either the distance between the aircraft and the previously scheduled aircraft is greater than or equal to the passback restriction distance, or the required holding to ensure proper spacing is less than or equal to the boundary holding limit.

1. Update aircraft metering information (speed, eta, etc.).
2. Set aircraft restriction distance to current passback restriction distance.

iii. Else

1. Increment emulator passback restriction distance by passback-increment (since the aircraft could not be scheduled).
2. If the aircraft has a non-negative maximum ground delay value and the aircraft delay has reached this value a. Set the aircraft takeoff exception flag to true.

3. Set unscheduled to the aircraft and exit the loop c. If unscheduled is null.

i. Schedule all noBoundary aircraft with predicted time greater than or equal to simulation-time.

ii. Advance simulation-time one time-step.

iii. Calculate minimum and average restriction distance of all scheduled aircraft in all emulators.

iv. If minimum restriction distance is greater than passback restriction distance.

1. Set passback restriction distance to zero.

v. Else if passback restriction distance is greater than the metering constraint miles-in-trail-value:

1. Set passback restriction distance to the metering miles-in-trail value.

vi. Else if average distance is greater equal than passback restriction distance:

1. Reduce passback restriction distance by passback-increment.

d. Else i. If the unscheduled aircraft has the takeoff exception set to true

1. Schedule the unscheduled aircraft ii. Update the passback restriction distance as the minimum of the current restriction distance and the distance traveled by the last scheduled aircraft before updating the schedule.

iii. Increase the passback restriction distance by passback-increment

4. Remove passback intervals with zero distance restriction.

The Passback Boundary Estimator Component

In the general case, a primary metering constraint may restrict the aircraft flow at several tiers or levels. This capability is computed by chaining boundaries from upstream centers to boundaries at the edge of the center boundary where the primary metering constraint is located. Thus, boundary dependencies form a directed graph, with the primary metering constraint as the sink of the graph. This implies that the estimation of boundary passback values must be done in stages, starting at the center containing the primary metering constraint and expanding it upstream, until all boundaries have been covered. The procedure presented here does this by constructing a reverse dependency tree, and walking through each node in a depth-first search manner.

During the passback computation, it is possible that the procedure may assign different miles-in-trail values to a boundary in order to analyze the impact of this value on the passback values of other boundaries. It is also possible that the user may want to fix the miles-in-trail value for a particular boundary and let the procedure figure out the passback values for the other boundaries. For sake of clarity, the term "prescribed boundary" is used to define a boundary with a non-zero miles-in-trail value. Consequently, the term "unprescribed boundary" is a boundary with a value of zero miles-in-trail.

(a) Passback Boundary Estimator Assumptions

There are two critical assumptions made in the passback boundary estimator component:

There is at least one metering constraint with a non-boundary route fix, a non-zero miles-in-trail value and a start time within the analysis time frame, namely the primary constraint.

The set of metering and boundary constraints do not form a cycle.

(b) Passback Boundary Estimation Procedure

1. If not explicitly given, determine the primary constraint as the active metering constraint with a non-boundary route fix and a non-zero miles-in-trail value.
2. Set the primary constraint as the sink of the graph and as this node.
3. Get the schedule information (the passback aircraft list) for this node by calling the Aircraft Scheduler.
4. Get the unprescribed boundaries (boundaries with zero miles-in-trail) pointing to this node from the schedule information.
5. Discard unprescribed boundaries with less than two aircraft crossing the boundary or with no delayed traffic.

6. Add the remaining boundaries as boundary children of this node.
7. For each boundary child, use the schedule information to determine:
   a. The first scheduled aircraft predicted to cross the boundary with a passback delay greater than one minute, and set the aircraft unmetered crossing time as the start time of the boundary.
   b. The last scheduled aircraft predicted to cross the boundary, and set the aircraft metered crossing time as the stop time of the boundary.
   c. The accumulated passback distance for all aircraft scheduled in the time interval defined by the start and stop times of the boundary (every passback aircraft contains this information).
   d. The number of aircraft scheduled to cross this and any non-prescribed sibling boundary (a boundary with the same parent) in the time interval determined by the start and stop time of this boundary. Divide this number by the number of non-prescribed sibling boundaries and set it as the average passback count for the boundary.
   e. Divide the accumulated passback distance by the number of aircraft scheduled to cross this and any non-prescribed sibling boundary, round the result down to the nearest increment of five, and set it as the miles in trail value for this boundary.
   f. The delay statistics (minimum, maximum and average), schedule and unscheduled aircraft for the boundary. This information will be used to create the expected outcome.
8. For each boundary child:
   a. If the number of aircraft scheduled to cross the boundary is less than the calculated average passback count, the obtained miles-in-trail value can be tightened by prescribing the boundary as follows:
      i. Determine the average accumulated passback distance as the accumulated passback distance divided by the average passback count.
      ii. Scale the average accumulated passback distance by the ratio of the number of aircraft scheduled to cross the boundary and the average passback count.
      iii. Round down the result to the nearest increment of five, and set it as the miles-in-trail value for the boundary.
9. If a child was prescribed, recompute all unprescribed children to update their values.
10. Recursively call the Boundary Passback Procedure for each boundary child with this node as the primary metering constraint. This step will compute and return the passback values for upstream boundaries.
11. Create outcome information by traversing the constructed tree and gathering the appropriate information.

Description of Embodiments

For the following embodiment description, assume that the CAN1East Playbook route is active for the entire duration of the exercise, and the existence of two departure streams towards New York (JFK) make up the entire aircraft traffic. The primary metering constraint is 20 nmi at Aberdeen (ABR); one boundary is located at the Minneapolis Center boundary between Aberdeen and Rapid City (RAP), namely the Rapid City boundary (RAPBDRY). In addition, two boundaries just outside the Denver Center boundary with the Salt Lake Center are defined to capture traffic passing through Crazy Woman (CZI) and Meeker (EKR).

Figure 5:
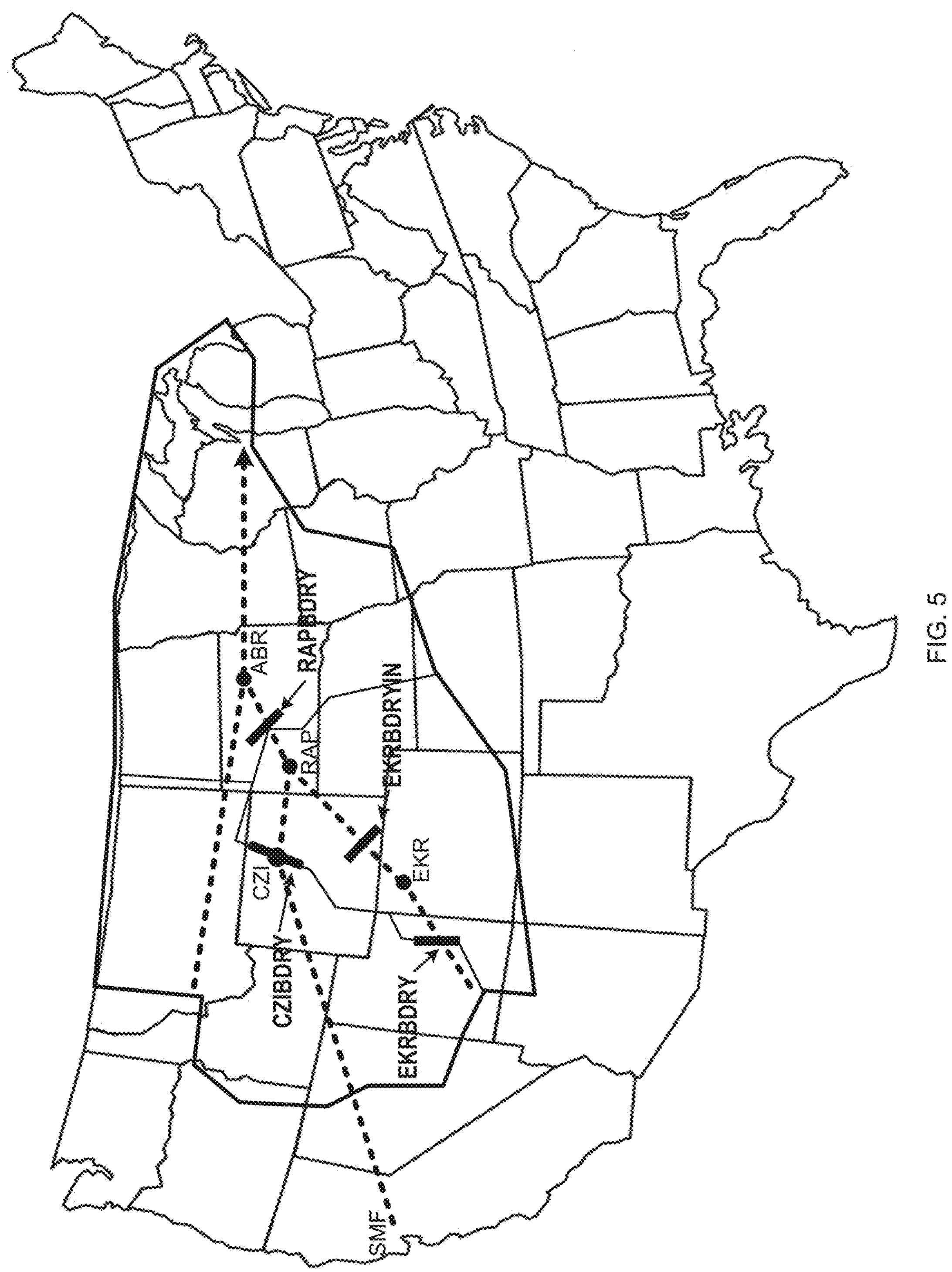
FIG. 5 is a schematic map showing the conditions for the embodiment description.

FIG. 5 shows a schematic of the situation described here. The boundaries are named CZIBDRY and EKRBDRY, respectively. In order to ensure equidistance, an additional boundary associated to EKRBDRY (EKRBDRYIN) was added roughly 187 nmi from RAP (the same distance from CZI to RAP). Thus, EKRBDRYIN is the routing fix for EKRBDRY, RAPBDRY is the routing fix for both CZIBDRY and EKRBDRYIN, and ABR is the route fix for RAPBDRY.

Balanced Flows

This balanced flow scenario contains 20 identical aircraft specifications, 10 flights for each of the two streams. The first stream contains United Airlines flights (UAL601-UAL610) departing from Los Angeles (LAX) at a rate of one aircraft per minute. Similarly, the second stream is composed of Delta Airlines flights (DAL701-DAL710) departing from San Francisco (SFO) at a rate of one aircraft per minute. LAX flights pass through EKRBDRY and EKRBDRYIN, while the SFO flights cross CZIBDRY. Both streams merge at RAP and pass through RAPBDRY, on their way to ABR. The start time of the analysis is set to 16:00 hours, and the analysis time is 4 hours. There is no minimum required ground delay, and speed reduction is not prescribed (set to zero). However, the scenario is crafted to ensure that the unconstrained times of the first aircraft from each stream are the same at the RAPBDRY. Thus, not only the start times of DAL701 and UAL601 at RAPBDRY must match, but also the start times of DAL701 at CZIBDRY and UAL601 at EKRBDRYIN must be the same (recall that the boundaries are located at the same distance from RAPBDRY and there is no speed reduction).

Under ideal conditions, the optimal solution for this case scenario is the seamless merging of both streams while enforcing the primary metering constraint. Thus, the optimal aircraft lineup at ABR would be one aircraft from SFO followed by one aircraft from LAX, or the other way around (i.e., one aircraft from LAX followed by one aircraft from SFO). All aircraft evenly spaced by 20 nmi. Since the flows are balanced (same number of aircraft and same flow rate), the average aircraft spacing at both boundaries (CZIBDRY and EKRBDRYIN) would be two times the space needed at the primary constraint, i.e., 40 nmi at each boundary.

TABLE 1

The following table is the reported outcome.

| Boundary | MIT | Start-Stop times | Flights | Total delay | Average delay | Minimum delay | Maximum delay |
|---|---|---|---|---|---|---|---|
| RAPBDRY | 20 | 17:12-18:10 | 19 | 409 | 21.53 | 4 | 40 |
| EKRBDRYIN | 40 | 16:38-17:35 | 10 | 210 | 21.00 | 3 | 39 |
| EKRBDRY | 40 | 16:07-16:50 | 9 | 135 | 15.00 | 3 | 27 |
| CZIBDRY | 40 | 16:40-17:32 | 9 | 186 | 20.00 | 4 | 36 |

The outcome provides the following aircraft lineup at ABR, which is the ideal: DAL701, UAL601, DAL702, UAL602, DAL703, UAL603, DAL704, UAL604, DAL705, UAL605, DAL706, UAL606, DAL707, UAL607, DAL708, UAL608, DAL709, UAL609, DAL710, UAL610. Since DAL701 and UAL601 were predicted to cross the same boundary (RAPBDRY) at the same time (17:12:14), it is important to mention the tie-breaking rule that allowed DAL701 to be scheduled first. If two or more aircraft are predicted to cross a boundary at the same time (same start time in the Schedule table), the tie is broken by lexicographical sorting on the boundary name first, and then by the aircraft unique identifier. The aircraft unique identifier is assigned when the aircraft becomes airborne, and it is a monotonically increasing value. For example, DAL701 and UAL601 were predicted to cross the same boundary (RAPBDRY) at the same time (17:12:14). Thus, the tie was broken based on the aircraft unique identifier, and DAL701 was selected ahead of UAL601 because it departed before UAL601. In the remainder of this description, the procedure that led to the outcome is applied to each boundary, given a step-by-step explanation of the reported results.

(a) Estimating RAP Boundary (RAPBDRY) Passback

The schedule and spacing information required to estimate the passback value for the RAP boundary are shown below. The start time is the unmetered boundary crossing time, whereas the scheduled time is the metered boundary crossing time. The meter or release time is the time at which the aircraft will cross the primary constraint (ABR in this case). The passback delay is the amount of time to be absorbed prior to crossing and since there are no no-boundary aircraft, the holding time will always be zero for this scenario. Finally, the boundary is the boundary to be crossed at the scheduled time.

TABLE 2

| Schedule | | | | | | |
|---|---|---|---|---|---|---|
| Aircraft | Start time | Scheduled time | Meter time | Passback delay | Holding | Boundary |
| DAL701 | 17:12:14 | 17:12:14 | 17:31:23 | 00:00:00 | 00:00:00 | RAPBDRY |
| UAL601 | 17:12:14 | 17:16:14 | 17:35:00 | 00:04:00 | 00:00:00 | RAPBDRY |
| DAL702 | 17:14:14 | 17:19:14 | 17:38:22 | 00:05:00 | 00:00:00 | RAPBDRY |
| UAL602 | 17:14:14 | 17:22:14 | 17:41:00 | 00:08:00 | 00:00:00 | RAPBDRY |
| DAL703 | 17:16:14 | 17:25:14 | 17:44:22 | 00:09:00 | 00:00:00 | RAPBDRY |
| UAL603 | 17:16:14 | 17:28:14 | 17:47:00 | 00:12:00 | 00:00:00 | RAPBDRY |
| DAL704 | 17:18:14 | 17:31:14 | 17:50:22 | 00:13:00 | 00:00:00 | RAPBDRY |
| UAL604 | 17:18:14 | 17:34:14 | 17:53:00 | 00:16:00 | 00:00:00 | RAPBDRY |
| DAL705 | 17:20:14 | 17:37:14 | 17:56:22 | 00:17:00 | 00:00:00 | RAPBDRY |
| UAL605 | 17:20:14 | 17:40:14 | 17:59:00 | 00:20:00 | 00:00:00 | RAPBDRY |
| DAL706 | 17:22:14 | 17:43:14 | 18:02:22 | 00:21:00 | 00:00:00 | RAPBDRY |
| UAL606 | 17:22:14 | 17:46:14 | 18:04:59 | 00:24:00 | 00:00:00 | RAPBDRY |
| DAL707 | 17:24:14 | 17:49:14 | 18:08:21 | 00:25:00 | 00:00:00 | RAPBDRY |
| UAL607 | 17:24:14 | 17:52:14 | 18:10:59 | 00:28:00 | 00:00:00 | RAPBDRY |
| DAL708 | 17:26:14 | 17:55:14 | 18:14:21 | 00:29:00 | 00:00:00 | RAPBDRY |
| UAL608 | 17:26:14 | 17:58:14 | 18:16:59 | 00:32:00 | 00:00:00 | RAPBDRY |
| DAL709 | 17:28:14 | 18:01:14 | 18:20:21 | 00:33:00 | 00:00:00 | RAPBDRY |
| UAL609 | 17:28:14 | 18:04:14 | 18:22:59 | 00:36:00 | 00:00:00 | RAPBDRY |
| DAL710 | 17:30:14 | 18:07:14 | 18:26:21 | 00:37:00 | 00:00:00 | RAPBDRY |
| UAL610 | 17:30:14 | 18:10:14 | 18:28:59 | 00:40:00 | 00:00:00 | RAPBDRY |

As part of the procedure, the boundary keeps track of aircraft spacing intervals. This information is used to calculate the accumulated sum of the required distance at the boundary.

TABLE 3

| Aircraft spacing | | |
|---|---|---|
| Distance | Start | End |
| 10 | 17:13:14 | 17:14:14 |
| 20 | 17:14:14 | 17:15:14 |
| 25 | 17:15:14 | 17:16:14 |
| 20 | 17:16:14 | 18:10:14 |
| 0 | 18:10:14 | 20:00:14 |

To estimate the passback value, the following steps are required:

1. Determine the first aircraft that has a positive passback delay for each boundary and record its start time as the boundary start time: UAL601 is the first aircraft with a passback delay of 4 minutes and start time 17:12. Thus, the RAPBDRY start time is set to 17:12 hrs.
2. Determine the last aircraft that is scheduled for each boundary and record the schedule time as the boundary stop time: UAL610 is the last scheduled aircraft with schedule time 18:10. Thus, the RAPBDRY stop time is set to 18:10 hrs.
3. Calculate passback distance for individual boundaries as the quotient of the accumulated passback distance divided by the number of scheduled aircraft that crossed the boundary. In this case, the accumulated sum of the required distance at the RAPBDRY was 390 nmi. Since the first aircraft never has a passback delay, it is not considered in the distance computation. Thus, 385/19=20.26 rounded to 20 nmi.

(b) Estimating CZI (CZIBDRY) and EKRIN (EKRBDRYIN) Boundary Passbacks

Recall that the procedure will combine the boundaries into one combined boundary in order to determine the aircraft schedule and spacing.

TABLE 4

| Combined schedule | | | | | | |
|---|---|---|---|---|---|---|
| Aircraft | Start time | Scheduled time | Meter time | Passback delay | Holding | Boundary |
| DAL701 | 16:38:14 | 16:38:14 | 17:12:21 | 00:00:00 | 00:00:00 | CZIBDRY |
| UAL601 | 16:38:14 | 16:41:14 | 17:15:08 | 00:03:00 | 00:00:00 | EKRBDRYIN |
| DAL702 | 16:40:14 | 16:44:14 | 17:18:21 | 00:04:00 | 00:00:00 | CZIBDRY |
| UAL602 | 16:40:14 | 16:47:14 | 17:21:08 | 00:07:00 | 00:00:00 | EKRBDRYIN |
| DAL703 | 16:42:14 | 16:50:14 | 17:24:21 | 00:08:00 | 00:00:00 | CZIBDRY |
| UAL603 | 16:42:14 | 16:53:14 | 17:27:08 | 00:11:00 | 00:00:00 | EKRBDRYIN |
| DAL704 | 16:44:14 | 16:56:14 | 17:30:21 | 00:12:00 | 00:00:00 | CZIBDRY |
| UAL604 | 16:44:14 | 16:59:14 | 17:33:07 | 00:15:00 | 00:00:00 | EKRBDRYIN |
| DAL705 | 16:46:14 | 17:02:14 | 17:36:20 | 00:16:00 | 00:00:00 | CZIBDRY |
| UAL605 | 16:46:14 | 17:05:14 | 17:39:07 | 00:19:00 | 00:00:00 | EKRBDRYIN |
| DAL706 | 16:48:14 | 17:08:14 | 17:42:20 | 00:20:00 | 00:00:00 | CZIBDRY |
| UAL606 | 16:48:14 | 17:11:14 | 17:45:07 | 00:23:00 | 00:00:00 | EKRBDRYIN |
| DAL707 | 16:50:14 | 17:14:14 | 17:48:20 | 00:24:00 | 00:00:00 | CZIBDRY |
| UAL607 | 16:50:14 | 17:17:14 | 17:51:07 | 00:27:00 | 00:00:00 | EKRBDRYIN |
| DAL708 | 16:52:14 | 17:20:14 | 17:54:20 | 00:28:00 | 00:00:00 | CZIBDRY |
| UAL608 | 16:52:14 | 17:23:14 | 17:57:07 | 00:31:00 | 00:00:00 | EKRBDRYIN |
| DAL709 | 16:54:14 | 17:26:14 | 18:00:20 | 00:32:00 | 00:00:00 | CZIBDRY |
| UAL609 | 16:54:14 | 17:29:14 | 18:03:07 | 00:35:00 | 00:00:00 | EKRBDRYIN |
| DAL710 | 16:56:14 | 17:32:14 | 18:06:19 | 00:36:00 | 00:00:00 | CZIBDRY |
| UAL610 | 16:56:14 | 17:35:14 | 18:09:07 | 00:39:00 | 00:00:00 | EKRBDRYIN |

The combined aircraft spacing can also be used to cross-validate the merging of flows, since the combined values should never be more than the estimated individual passback values.

TABLE 5

| Combined aircraft spacing | | |
|---|---|---|
| Distance | Start | End |
| 10 | 16:39:14 | 16:40:14 |
| 20 | 16:40:14 | 17:35:14 |
| 0 | 17:35:14 | 20:00:14 |

To estimate the passback value, the following steps are required:

1. Determine the first aircraft that has a positive passback delay for each boundary and record its start time as the boundary start time: UAL601 is the first aircraft with a passback delay of 3 minutes for EKRBDRYIN and start time 16:38. Thus, the EKRBDRYIN start time is set to 16:38 hrs. DAL702 is the first aircraft with a passback delay of 7 minutes for CZIBDRY and start time 16:40. Thus, the CZIBDRY start time is set to 16:40 hrs.
2. Determine the last aircraft that is scheduled for each boundary and record the schedule time as the boundary stop time: UAL610 is the last scheduled aircraft for EKRBDRYIN with schedule time 17:35. Thus, the EKRBDRYIN stop time is set to 17:35 hrs. DAL710 is the last scheduled aircraft for CZIBDRY with schedule time 17:32. Thus, the CZIBDRY stop time is set to 17:32 hrs.
3. Calculate passback distance for individual boundaries as the quotient of the accumulated passback distance divided by the number of scheduled aircraft that crossed the boundary. The accumulated required distance of 10 aircraft passing through EKRBDRYIN is 380 nmi, whereas the accumulated required distance of 9 aircraft crossing CZIBDRY is 360 (the first aircraft is always free). Thus, the passback value for EKRBDRYIN is 380/10=38, rounded to 40 nmi., and for CZIBDRY is 360/9=40 nmi.

(c) Estimating EKR Boundary (EKRBDRY) Passback

TABLE 6

| Schedule | | | | | | |
|---|---|---|---|---|---|---|
| Aircraft | Start time | Scheduled time | Meter time | Passback delay | Holding | Boundary |
| UAL601 | 16:05:14 | 16:05:14 | 16:38:36 | 00:00:00 | 00:00:00 | EKRBDRY |
| UAL602 | 16:07:14 | 16:10:14 | 16:43:35 | 00:03:00 | 00:00:00 | EKRBDRY |
| UAL603 | 16:09:14 | 16:15:14 | 16:48:35 | 00:06:00 | 00:00:00 | EKRBDRY |
| UAL604 | 16:11:14 | 16:20:14 | 16:53:35 | 00:09:00 | 00:00:00 | EKRBDRY |
| UAL605 | 16:13:14 | 16:25:14 | 16:58:35 | 00:12:00 | 00:00:00 | EKRBDRY |
| UAL606 | 16:15:14 | 16:30:14 | 17:03:34 | 00:15:00 | 00:00:00 | EKRBDRY |
| UAL607 | 16:17:14 | 16:35:14 | 17:08:34 | 00:18:00 | 00:00:00 | EKRBDRY |
| UAL608 | 16:19:14 | 16:40:14 | 17:13:34 | 00:21:00 | 00:00:00 | EKRBDRY |
| UAL609 | 16:21:14 | 16:45:14 | 17:18:34 | 00:24:00 | 00:00:00 | EKRBDRY |
| UAL610 | 16:23:14 | 16:50:14 | 17:23:34 | 00:27:00 | 00:00:00 | EKRBDRY |

TABLE 7

| Aircraft spacing | | |
|---|---|---|
| Distance | Start | End |
| 20 | 16:07:14 | 16:08:14 |
| 25 | 16:08:14 | 16:09:14 |
| 40 | 16:09:14 | 16:50:14 |
| 0 | 16:50:14 | 20:00:14 |

To estimate the passback value, the following steps are required:

1. Determine the first aircraft that has a positive passback delay for each boundary and record its start time as the boundary start time: UAL602 is the first aircraft with a passback delay of 3 minutes and start time 16:07. Thus, the EKRBDRY start time is set to 16:07 hrs.
2. Determine the last aircraft that is scheduled for each boundary and record the schedule time as the boundary stop time: UAL610 is the last scheduled aircraft with schedule time 16:50. Thus, the EKRBDRY stop time is set to 16:50 hrs.
3. Calculate passback distance for individual boundaries as the quotient of the accumulated passback distance divided by the number of scheduled aircraft that crossed the boundary. Since the same traffic flows for EKRBDRY and EKRBDRYIN, the distance is the same: 380/10=38 rounded to 40 nmi.

Unbalanced Flows

This case scenario is similar to the previous one, but in this case one stream is pushing twice the flow than the other one. That is, there are 20 identical aircraft specifications, 10 flights for each stream. The first stream contains United Airlines flights (UAL601-UAL610) departing from Los Angeles (LAX) at a rate of one aircraft per minute. The second stream is composed of Delta Airlines flights (DAL701-DAL710) departing from San Francisco (SFO) at a rate of one aircraft every two minutes. LAX flights will pass through EKRBDRY and EKRBDRYIN, while the SFO flights will cross CZIBDRY. Both streams will merge at RAP and pass through RAPBDRY, on their way to ABR. The start time of the analysis is set to 16:00 hours, and the analysis time is 4 hours. There is no minimum required ground delay, and speed reduction is not prescribed (set to zero). However, the scenario was crafted to ensure that the unconstrained times of the first aircraft from each stream are the same at the RAPBDRY. Thus, not only the start times of DAL701 and UAL601 at RAPBDRY must match, but also the start times of DAL701 at CZIBDRY and UAL601 at EKRBDRYIN must be the same (recall that the boundaries are located at the same distance from RAPBDRY and there is no speed reduction).

Under ideal conditions, the optimal solution for this case scenario is the seamless merging of both streams while enforcing the primary metering constraint. Thus, the optimal aircraft lineup at ABR would be one aircraft from SFO followed by two aircraft from LAX until all LAX aircraft crossed ABR and then all remaining SFO aircraft. All evenly spaced by 20 nmi. Thus, the average required aircraft at CZIBDRY for this lineup would be 5 aircraft 60 miles apart (to accommodate 2 LAX aircraft 20 miles apart), and 4 aircraft 20 miles apart (the first SFO aircraft is unrestricted). Thus, the total distance is 380 nmi divided by 9 is 42.2 nmi. Similarly, the average spacing at EKRBDRYIN would be 4 aircraft 40 miles apart (to accommodate the SFO aircraft), and 6 aircraft 20 miles apart. Thus, the total distance is 280 nmi divided by 10 is 28 nmi.

TABLE 8

| The following table is the reported outcome. | | | | | | | |
|---|---|---|---|---|---|---|---|
| Boundary | MIT | Start-Stop times | Flights | Total delay | Average delay | Minimum delay | Maximum delay |
| RAPBDRY | 20 | 17:12-18:10 | 19 | 454 | 23.89 | 4 | 40 |

TABLE 8-continued

| The following table is the reported outcome. | | | | | | | |
|---|---|---|---|---|---|---|---|
| Boundary | MIT | Start-Stop times | Flights | Total delay | Average delay | Minimum delay | Maximum delay |
| EKRBDRYIN | 25 | 16:38-17:20 | 10 | 180 | 18.00 | 3 | 33 |
| EKRBDRY | 25 | 16:06-16:41 | 9 | 135 | 15.00 | 3 | 27 |
| CZIBDRY | 40 | 16:40-17:35 | 9 | 255 | 28.33 | 7 | 39 |

The outcome provides the following aircraft lineup, which is the ideal: DAL701, UAL601, UAL602, DAL702, UAL603, UAL604, DAL703, UAL605, UAL606, DAL704, UAL607, UAL608, DAL705, UAL609, UAL610, DAL706, DAL707, DAL708, DAL709, DAL710.

The passback values are calculated as follows: DAL701 is the first aircraft to cross ABR, so no spacing is required. 60 nmi are required for DAL702-DAL706, because 2 LAX aircraft must line up in between. The remaining SFO aircraft (DAL707-DAL710) follow each other, so they require 20 nmi. Thus, 5×60+4×20=380 and 380/9=42.2 rounded down to 40 nmi. Similarly, the first LAX aircraft UAL601 requires only 20 nmi because it follows the first SFO aircraft DAL701. Similarly, 5 LAX aircraft (UAL602, UAL604, UAL606, UAL608 and UAL610) require 20 nmi between them, since they follow another LAX flight. The remaining 4 LAX aircraft (UAL603, UAL605, UAL607 and UAL609) require 40 nmi because one SFO aircraft must lineup in between LAX aircraft. Thus, 6×20+4×40=280 and 280/10=28 rounded down to 25 nmi.

In the remaining of this section, the procedure that led to the outcome is applied to each boundary, given a step-by-step explanation of the reported results.

(a) Estimating RAP Boundary (RAPBDRY) Passback

The schedule and spacing information required to estimate the passback value for the RAP boundary are shown below. Recall that the start time is the predicted unmetered crossing time, the scheduled time is the metered crossing time and the meter time is the time at which the aircraft will cross the primary constraint (ABR in this case). The passback delay is the amount of time to be absorbed prior to crossing and since there are no no-boundary aircraft, the holding time will always be zero for this scenario. Finally, the boundary is the boundary to be crossed at the scheduled time.

TABLE 9

| Schedule | | | | | | |
|---|---|---|---|---|---|---|
| Aircraft | Start time | Scheduled time | Meter time | Passback delay | Holding | Boundary |
| DAL701 | 17:12:14 | 17:12:14 | 17:31:23 | 00:00:00 | 00:00:00 | RAPBDRY |
| UAL601 | 17:12:14 | 17:16:14 | 17:35:00 | 00:04:00 | 00:00:00 | RAPBDRY |
| UAL602 | 17:13:14 | 17:19:14 | 17:38:00 | 00:06:00 | 00:00:00 | RAPBDRY |
| DAL702 | 17:14:14 | 17:22:14 | 17:41:22 | 00:08:00 | 00:00:00 | RAPBDRY |
| UAL603 | 17:14:14 | 17:25:14 | 17:44:00 | 00:11:00 | 00:00:00 | RAPBDRY |
| UAL604 | 17:15:14 | 17:28:14 | 17:47:00 | 00:13:00 | 00:00:00 | RAPBDRY |
| DAL703 | 17:16:14 | 17:31:14 | 17:50:22 | 00:15:00 | 00:00:00 | RAPBDRY |
| UAL605 | 17:16:14 | 17:34:14 | 17:53:00 | 00:18:00 | 00:00:00 | RAPBDRY |
| UAL606 | 17:17:14 | 17:37:14 | 17:56:00 | 00:20:00 | 00:00:00 | RAPBDRY |
| DAL704 | 17:18:14 | 17:40:14 | 17:59:22 | 00:22:00 | 00:00:00 | RAPBDRY |

TABLE 9-continued

| Schedule | | | | | | |
|---|---|---|---|---|---|---|
| Aircraft | Start time | Scheduled time | Meter time | Passback delay | Holding | Boundary |
| UAL607 | 17:18:14 | 17:43:14 | 18:02:00 | 00:25:00 | 00:00:00 | RAPBDRY |
| UAL608 | 17:19:14 | 17:46:14 | 18:05:00 | 00:27:00 | 00:00:00 | RAPBDRY |
| DAL705 | 17:20:14 | 17:49:14 | 18:08:22 | 00:29:00 | 00:00:00 | RAPBDRY |
| UAL609 | 17:20:14 | 17:52:14 | 18:11:00 | 00:32:00 | 00:00:00 | RAPBDRY |
| UAL610 | 17:21:14 | 17:55:14 | 18:13:59 | 00:34:00 | 00:00:00 | RAPBDRY |
| DAL706 | 17:22:14 | 17:58:14 | 18:17:22 | 00:36:00 | 00:00:00 | RAPBDRY |
| DAL707 | 17:24:14 | 18:01:14 | 18:20:21 | 00:37:00 | 00:00:00 | RAPBDRY |
| DAL708 | 17:26:14 | 18:04:14 | 18:23:21 | 00:38:00 | 00:00:00 | RAPBDRY |
| DAL709 | 17:28:14 | 18:07:14 | 18:26:21 | 00:39:00 | 00:00:00 | RAPBDRY |
| DAL710 | 17:30:14 | 18:10:14 | 18:29:21 | 00:40:00 | 00:00:00 | RAPBDRY |

As part of the procedure, the boundary keeps track of aircraft spacing intervals. This information is used to calculate the accumulated sum of the required distance at the boundary (see below).

TABLE 10

| Aircraft spacing | | |
|---|---|---|
| Distance | Start | End |
| 10 | 17:13:14 | 17:14:14 |
| 20 | 17:14:14 | 17:15:14 |
| 25 | 17:15:14 | 17:16:14 |
| 20 | 17:16:14 | 18:10:14 |
| 0 | 18:10:14 | 20:00:14 |

To estimate the passback value, the following steps are required:

1. Determine the first aircraft that has a positive passback delay for each boundary and record its start time as the boundary start time: UAL601 is the first aircraft with a passback delay of 4 minutes and start time 17:12. Thus, the RAPBDRY start time is set to 17:12 hrs.
2. Determine the last aircraft that is scheduled for each boundary and record the schedule time as the boundary stop time: DAL710 is the last scheduled aircraft with schedule time 18:10. Thus, the RAPBDRY stop time is set to 18:10 hrs.
3. Calculate passback distance for individual boundaries as the quotient of the accumulated passback distance divided by the number of scheduled aircraft that crossed the boundary: 385/19=20.26 rounded to 20. Recall that the first aircraft never has a passback delay and it should not be considered in the distance computation.

(b) Estimating CZI (CZIBDRY) and EKRIN (EKRBDRYIN) Boundary Passbacks

TABLE 11

| Combined schedule | | | | | | |
|---|---|---|---|---|---|---|
| Aircraft | Start time | Scheduled time | Meter time | Passback delay | Holding | Boundary |
| DAL701 | 16:38:14 | 16:38:14 | 17:12:21 | 00:00:00 | 00:00:00 | CZIBDRY |
| UAL601 | 16:38:14 | 16:41:14 | 17:15:08 | 00:03:00 | 00:00:00 | EKRBDRYIN |
| UAL602 | 16:39:14 | 16:44:14 | 17:18:08 | 00:05:00 | 00:00:00 | EKRBDRYIN |
| DAL702 | 16:40:14 | 16:47:14 | 17:21:21 | 00:07:00 | 00:00:00 | CZIBDRY |
| UAL603 | 16:40:14 | 16:50:14 | 17:24:08 | 00:10:00 | 00:00:00 | EKRBDRYIN |
| UAL604 | 16:41:14 | 16:53:14 | 17:27:08 | 00:12:00 | 00:00:00 | EKRBDRYIN |

TABLE 11-continued

| Combined schedule | | | | | | |
|---|---|---|---|---|---|---|
| Aircraft | Start time | Sched-uled time | Meter time | Pass-back delay | Holding | Boundary |
| DAL703 | 16:42:14 | 16:56:14 | 17:30:21 | 00:14:00 | 00:00:00 | CZIBDRY |
| UAL605 | 16:42:14 | 16:59:14 | 17:33:08 | 00:17:00 | 00:00:00 | EKRBDRYIN |
| UAL606 | 16:43:14 | 17:02:14 | 17:36:07 | 00:19:00 | 00:00:00 | EKRBDRYIN |
| DAL704 | 16:44:14 | 17:05:14 | 17:39:21 | 00:21:00 | 00:00:00 | CZIBDRY |
| UAL607 | 16:44:14 | 17:08:14 | 17:42:07 | 00:24:00 | 00:00:00 | EKRBDRYIN |
| UAL608 | 16:45:14 | 17:11:14 | 17:45:07 | 00:26:00 | 00:00:00 | EKRBDRYIN |
| DAL705 | 16:46:14 | 17:14:14 | 17:48:20 | 00:28:00 | 00:00:00 | CZIBDRY |
| UAL609 | 16:46:14 | 17:17:14 | 17:51:07 | 00:31:00 | 00:00:00 | EKRBDRYIN |
| UAL610 | 16:47:14 | 17:20:14 | 17:54:07 | 00:33:00 | 00:00:00 | EKRBDRYIN |
| DAL706 | 16:48:14 | 17:23:14 | 17:57:20 | 00:35:00 | 00:00:00 | CZIBDRY |
| DAL707 | 16:50:14 | 17:26:14 | 18:00:20 | 00:36:00 | 00:00:00 | CZIBDRY |
| DAL708 | 16:52:14 | 17:29:14 | 18:03:20 | 00:37:00 | 00:00:00 | CZIBDRY |
| DAL709 | 16:54:14 | 17:32:14 | 18:06:20 | 00:38:00 | 00:00:00 | CZIBDRY |
| DAL710 | 16:56:14 | 17:35:14 | 18:09:19 | 00:39:00 | 00:00:00 | CZIBDRY |

The combined aircraft spacing can also be used to cross-validate the merging of flows, since the combined values should never be more than the estimated individual passback values.

TABLE 12

| Combined aircraft spacing | | |
|---|---|---|
| Distance | Start | End |
| 10 | 16:39:14 | 16:40:14 |
| 20 | 16:40:14 | 17:35:14 |
| 0 | 17:35:14 | 20:00:14 |

To estimate the passback value, the following steps are required:

1. Determine the first aircraft that has a positive passback delay for each boundary and record its start time as the boundary start time: UAL601 is the first aircraft with a passback delay of 3 minutes for EKRBDRYIN and start time 16:38. Thus, the EKRBDRYIN start time is set to 16:38 hrs. DAL702 is the first aircraft with a passback delay of 10 minutes for CZIBDRY and start time 16:40. Thus, the CZIBDRY start time is set to 16:40 hrs.
2. Determine the last aircraft that is scheduled for each boundary and record the schedule time as the boundary stop time: UAL610 is the last scheduled aircraft for EKRBDRYIN with schedule time 17:20. Thus, the EKRBDRYIN stop time is set to 17:20 hrs. DAL710 is the last scheduled aircraft for CZIBDRY with schedule time 17:35. Thus, the CZIBDRY stop time is set to 17:35 hrs.
3. Calculate passback distance for individual boundaries as the quotient of the accumulated passback distance divided by the number of scheduled aircraft that crossed the boundary: For EKRBDRYIN: 280/10=28 rounded down to 25. For CZIBDRY: 380/9=42.2 rounded down to 40.

(c) Estimating EKR Boundary (EKRBDRY) Passback

TABLE 13

| Schedule | | | | | | |
|---|---|---|---|---|---|---|
| Aircraft | Start time | Scheduled time | Meter time | Passback delay | Holding | Boundary |
| UAL601 | 16:05:14 | 16:05:14 | 16:38:36 | 00:00:00 | 00:00:00 | EKRBDRY |
| UAL602 | 16:06:14 | 16:09:14 | 16:42:35 | 00:03:00 | 00:00:00 | EKRBDRY |
| UAL603 | 16:07:14 | 16:13:14 | 16:46:35 | 00:06:00 | 00:00:00 | EKRBDRY |
| UAL604 | 16:08:14 | 16:17:14 | 16:50:35 | 00:09:00 | 00:00:00 | EKRBDRY |
| UAL605 | 16:09:14 | 16:21:14 | 16:54:35 | 00:12:00 | 00:00:00 | EKRBDRY |
| UAL606 | 16:10:14 | 16:25:14 | 16:58:35 | 00:15:00 | 00:00:00 | EKRBDRY |
| UAL607 | 16:11:14 | 16:29:14 | 17:02:35 | 00:18:00 | 00:00:00 | EKRBDRY |
| UAL608 | 16:12:14 | 16:33:14 | 17:06:35 | 00:21:00 | 00:00:00 | EKRBDRY |
| UAL609 | 16:13:14 | 16:37:14 | 17:10:35 | 00:24:00 | 00:00:00 | EKRBDRY |
| UAL610 | 16:14:14 | 16:41:14 | 17:14:35 | 00:27:00 | 00:00:00 | EKRBDRY |

TABLE 14

| Aircraft spacing | | |
|---|---|---|
| Distance | Start | End |
| 10 | 16:06:14 | 16:07:14 |
| 20 | 16:07:14 | 16:08:14 |
| 25 | 16:08:14 | 16:41:14 |
| 0 | 16:41:14 | 20:00:14 |

To estimate the passback value, the following steps are required:

1. Determine the first aircraft that has a positive passback delay for each boundary and record its start time as the boundary start time: UAL602 is the first aircraft with a passback delay of 3 minutes and start time 16:06. Thus, the EKRBDRY start time is set to 16:06 hrs.
2. Determine the last aircraft that is scheduled for each boundary and record the schedule time as the boundary stop time: UAL610 is the last scheduled aircraft with schedule time 16:41. Thus, the EKRBDRY stop time is set to 16:41 hrs.
3. Calculate passback distance for individual boundaries as the quotient of the accumulated passback distance divided by the number of scheduled aircraft that crossed the boundary: 225/9=25.

INDUSTRIAL APPLICATION

The invention disclosed herein pertains to the optimization of scheduling for aircraft that minimizes delays while maximizing throughput. It is useful in any industry where air traffic management is a dominant component.

CITATION LIST

Bilimoria, K. D., Sridhar, B., Chatterji, G., Sheth, K. S., and Grabbe, S., "FACET: Future ATM Concepts Evaluation Tool," *Air Traffic Control Quarterly, Vol.* 9, No. 1, 2001, pp. 1-20.

Sheth, K. and Gutierrez-Nolasco, S., "Development of Miles-in-Trail Passback Restrictions for Air Traffic Management," 33rd Digital Avionics Systems Conference, Colorado Springs, Colo., October 2014.

Volpe National Transportation Systems Center, "Enhanced Traffic Management System (ETMS) Functional Description," U.S. Dept. of Transportation, Cambridge, Mass., March 1999.

What is claimed is:

1. A system for managing air traffic for optimal throughput of air traffic, the system using miles-in-trail passback restrictions for aircraft traveling via multiple merging routes through intermediate boundaries across a common metered location that satisfies the primary miles-in-trail restriction at the common metered location, the system comprising:

an initializer configured to accept and validate input parameters for setting system default limits;

a memory, coupled to the initializer, configured to store the valid input parameters and predicted times of arrival for each aircraft at the common metered location having the primary miles-in-trail restriction;

a passback boundary estimator, coupled to the memory, having a processor configured to compute boundary miles-in-trail passback restrictions for a plurality of merging routes to the common metered location which pass through a plurality of intermediate boundaries based on currently scheduled air traffic for the common metered location to satisfy the primary miles-in-trail restriction; and an aircraft scheduler, coupled to the passback boundary estimator, configured to update the boundary miles-in-trail passback restrictions at said plurality of intermediate boundaries for optimal throughput of air traffic.

2. The system of claim 1, wherein the primary miles-in-trail restriction at the common metered location includes aircraft that do not pass through the plurality of intermediate boundaries.

3. The system of claim 1, wherein the passback boundary estimator uses speed control of individual aircraft to satisfy the primary miles-in-trail restriction at the common metered location.

4. The system of claim 1, wherein the passback boundary estimator uses aircraft vectoring to absorb delay of airborne aircraft to satisfy the primary miles-in-trail restriction at the common metered location.

5. The system of claim 1, wherein the aircraft scheduler does not allow any aircraft to be delayed on the ground beyond a specified maximum limit.

6. The system of claim 1, wherein the aircraft scheduler forces aircraft to be delayed on the ground for a specified minimum limit.

7. The system of claim 1, wherein the aircraft scheduler allows for probabilistic uncertainty in departure times when the aircraft are scheduled.

8. The system of claim 1, wherein the initializer allows for deviation of the input parameters for setting system default limits.

9. A method for managing air traffic for optimal throughput of air traffic, the method using miles-in-trail passback restrictions for aircraft traveling via multiple merging routes through intermediate boundaries across a common metered location that satisfies the primary miles-in-trail restriction at the common metered location, the method comprising the steps of:

initializing system default limits by accepting and validating input parameters;

compiling a list of all aircraft predicted to pass through the common metered location having the primary miles-in-trail restriction within a specified time window;

ordering the list of aircraft based on predicted time of arrival at the common metered location having the primary miles-in-trail restriction;

creating a plurality of equidistant intermediate boundaries on the merging routes that are equidistant from a downstream intermediate boundary or the common metered location having the primary miles-in-trail restriction;

combining the plurality of equidistant intermediate boundaries that merge to the immediate downstream common metered location; and scheduling each aircraft to avoid violating the primary miles-in-trail restriction at the common metered location by increasing the passback value by a fixed amount at a first portion of said plurality of intermediate boundaries and simultaneously incrementing the aircraft's delay by a fixed amount at a second portion of said plurality of intermediate boundaries until all predicted times of arrival for all aircraft are optimized.

10. The method according to claim 9, wherein the primary miles-in-trail restriction at the common metered location includes aircraft that do not pass through the plurality of intermediate boundaries.

11. The method according to claim 9, wherein the step of scheduling each aircraft includes the step of computing boundary miles-in-trail passback restrictions for the plurality of intermediate boundaries by using speed control of each aircraft to satisfy the primary miles-in-trail restriction at the common metered location.

12. The method according to claim 9, wherein the step of scheduling each aircraft includes the step of aircraft vectoring to absorb delay of airborne aircraft to satisfy the primary miles-in-trail restriction at the common metered location.

13. The method according to claim 9, wherein the step of scheduling each aircraft does not allow any aircraft to be delayed on the ground beyond a specific maximum limit.

14. The method according to claim 9, wherein the step of scheduling forces each aircraft to be delayed on the ground by a specific minimum limit.

15. The method according to claim 9, wherein the step of scheduling each aircraft allows probabilistic uncertainty in departure times when the aircraft are scheduled.

16. The method according to claim 9, wherein the step of initializing system default limits allows for deviation of the input parameters.

* * * * *